United States Patent
Liu

(10) Patent No.: US 11,963,233 B2
(45) Date of Patent: Apr. 16, 2024

(54) METHOD AND DEVICE FOR TRANSMITTING A RANDOM ACCESS MESSAGE, AND A STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 408 days.

(21) Appl. No.: 17/430,678

(22) PCT Filed: Feb. 14, 2019

(86) PCT No.: PCT/CN2019/075098
§ 371 (c)(1),
(2) Date: Aug. 12, 2021

(87) PCT Pub. No.: WO2020/164058
PCT Pub. Date: Aug. 20, 2020

(65) Prior Publication Data
US 2022/0256607 A1   Aug. 11, 2022

(51) Int. Cl.
*H04W 74/0833* (2024.01)
(52) U.S. Cl.
CPC .................. *H04W 74/0833* (2013.01)
(58) Field of Classification Search
CPC .............. H04W 74/0808; H04W 74/0833
See application file for complete search history.

(56) References Cited

U.S. PATENT DOCUMENTS

| 2015/0110076 | A1 | 4/2015 | Yang et al. |
| 2020/0077446 | A1* | 3/2020 | Agiwal ............. H04W 16/14 |
| 2020/0221508 | A1* | 7/2020 | Huang .............. H04W 74/006 |
| 2021/0266972 | A1* | 8/2021 | Taherzadeh Boroujeni ........... H04W 74/0833 |
| 2021/0352737 | A1* | 11/2021 | Yang ............... H04W 74/0833 |

(Continued)

FOREIGN PATENT DOCUMENTS

| CN | 101662836 A | 3/2010 |
| CN | 102404864 A | 4/2012 |
| CN | 104754758 A | 7/2015 |

(Continued)

OTHER PUBLICATIONS

English translation of the Written Opinion of the International Search Authority in the international application No. PCT/CN2019/075098, dated Jul. 30, 2019, (3p).

(Continued)

*Primary Examiner* — Kashif Siddiqui
(74) *Attorney, Agent, or Firm* — Arch & Lake LLP

(57) ABSTRACT

A method for transmitting a random access message, a device and a non-transitory computer-readable storage medium thereof are provided. The method includes that in a random access process based on an unlicensed channel, a terminal performs random access preamble transmission in a first Rach Occasion (RO) in a Listen Before Talk (LBT) mode before arrival of the first RO. If the terminal does not receive a Random Access Response (RAR) returned by a base station before arrival of a second RO, the terminal continues to perform random access preamble transmission in the second RO in the LBT mode.

17 Claims, 17 Drawing Sheets

(56) References Cited

U.S. PATENT DOCUMENTS

2022/0191940 A1* 6/2022 MolavianJazi ... H04W 74/0833

FOREIGN PATENT DOCUMENTS

| CN | 109275187 A | 1/2019 |
|----|-------------|--------|
| CN | 109314998 A | 2/2019 |

OTHER PUBLICATIONS

International Search Report of PCT Application No. PCT/CN2019/075098 dated Jul. 30, 2019 with English translation, (4p).

* cited by examiner

METHOD AND DEVICE FOR TRANSMITTING A RANDOM ACCESS MESSAGE, AND A STORAGE MEDIUM

CROSS-REFERENCE TO RELATED APPLICATIONS

This application is the national phase Applications of International Application No. PCT/CN2019/075098, filed on Feb. 14, 2019, the entire contents of which are incorporated herein by reference for all purposes.

TECHNICAL FIELD

The present disclosure relates to the field of wireless communication technology, and more particularly, to a method and device for transmitting a random access message, and a storage medium.

BACKGROUND

To cope with a growing demand for mobile data communication, it is proposed in the industry to extend cellular mobile communication technology to an unlicensed frequency band. That is, a study of New Radio Based Unlicensed Access (NR-U) is proposed.

In related art, with NR-U technology in a wireless communication system, a terminal and a base station have to be enabled to transmit data to each other also by introducing a Listen Before Talk (LBT) mechanism and through a corresponding random access process.

SUMMARY

The present disclosure relates to the field of wireless communication technology. The present disclosure provides a method and device for transmitting a random access message, and a storage medium. The technical solution is as follows.

According to a first aspect of the present disclosure, there is provided a method for transmitting a random access message. The method is implemented by a terminal. The method includes that the terminal, in a random access process based on an unlicensed channel, performs random access preamble transmission in a first Rach Occasion (RO) in an LBT mode before arrival of the first RO, where the first RO is a first RO selected in the random access process.

Further, the method includes that: in response to determining that a Random Access Response (RAR) returned by a base station is not received before arrival of a second RO, the terminal performs random access preamble transmission in the second RO in the LBT mode, where the second RO is any RO within a RAR time window corresponding to the random access process, and the RAR time window is a period of a predetermined duration starting after the first RO.

According to a second aspect of the present disclosure, there is provided a device for transmitting a random access message. The device is applied to a terminal.

The device includes a processor and a memory configured to store processor executable instructions. The processor is configured to implement acts including: in a random access process based on an unlicensed channel, performing random access preamble transmission in a first RO in an LBT mode before arrival of the first RO, where the first RO is a first RO selected in the random access process; and in response to determining that a RAR returned by a base station is not received before arrival of a second RO, performing random access preamble transmission in the second RO in the LBT mode, where the second RO is any RO within a RAR time window corresponding to the random access process, and the RAR time window is a period of a predetermined duration starting after the first RO.

According to a third aspect of the present disclosure, there is provided a non-transitory computer-readable storage medium having stored therein instructions which, when executed by a processor in a terminal, implement any method according to the first aspect.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

Figure 1:
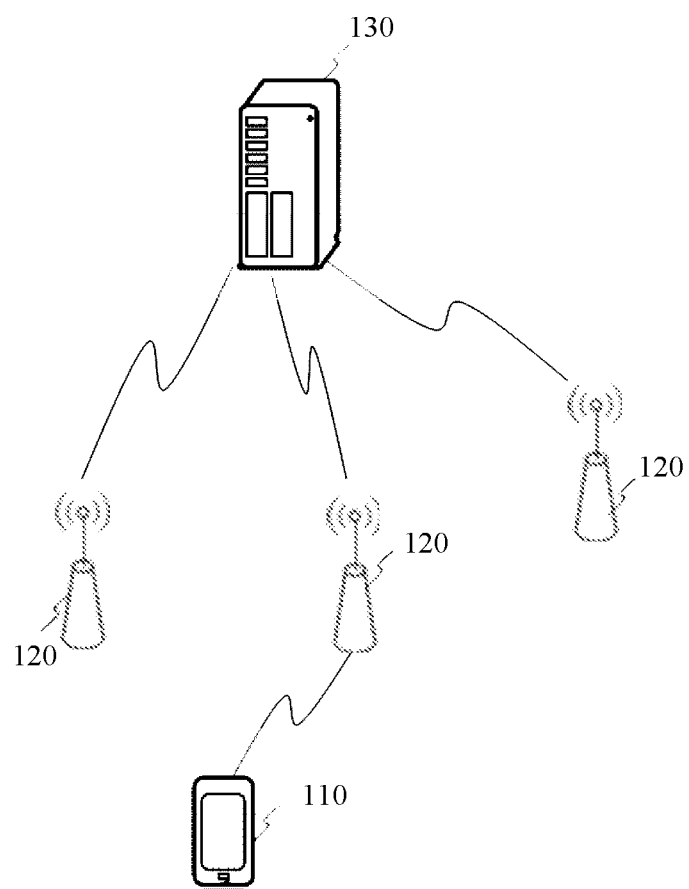
FIG. 1 is a diagram of a structure of a wireless communication system according to some illustrative embodiments.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims.

The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

It should be understood that herein by "a number of", it means one or more, and by "multiple", it means two or more. A term "and/or" describes an association between associated objects, including three possible relationships. For example, by A and/or B, it may mean that there may be three cases, namely, existence of but A, existence of both A and B, or existence of but B. A slash mark "/" generally denotes an "or" relationship between two associated objects that come respectively before and after the mark per se.

To cope with a growing demand for mobile data communication, it is proposed in the industry to extend cellular mobile communication technology to an unlicensed frequency band. That is, a study of New Radio Based Unlicensed Access (NR-U) is proposed.

In related art, with NR-U technology in a wireless communication system, a terminal and a base station have to be enabled to transmit data to each other also by introducing an LBT mechanism and through a corresponding random access process. However, there is no perfect solution for reducing a delay in NR-U-based random access.

Radio spectral resources are limited non-renewable natural resources. Therefore, respective countries have special agencies for managing radio spectra, and issue special policies and regulations, to implement unified planning and management of radio spectra. At present, most spectrum management in respective countries adopts a fixed spectrum allocation strategy, that is, spectral resources are managed by a government authority and allocated to a fixed authorized user. In this way, it is possible to ensure that excessive mutual interference among users is avoided and make better use of the spectral resources. At present, there may be two classes of spectral resources, i.e., a licensed spectrum and an unlicensed spectrum.

A licensed spectrum is strictly limited and protected, access to which is allowed only by an authorized user and compliant equipment of the authorized user, and typically the user has to pay for the access. At present, important departments such as public security, railway, civil aviation, radio and television, telecommunication, etc., all have certain licensed spectra. Communication of equipment within these departments, in particular the telecommunication industry, operates on licensed spectra of the departments. Mobile phones we use on a daily basis communicate through licensed spectra owned by an operator. Major operators all own a dedicated frequency band authorized by radio managing units or departments of their countries, to ensure interference-free public mobile communication.

An unlicensed spectrum is a spectrum accessible and usable by any equipment meeting certain specifications and standards, as long as there is no interference to another user. Typically, with communication technologies such as Wireless Fidelity (Wi-Fi), Bluetooth (BT), etc., transmission is performed over an unlicensed spectrum. In addition, Bureau of Radio Communication of International Telecommunication Union has defined an Industrial Scientific Medical (ISM) frequency band, which is mainly open to use by industry, science, and medical institutions, without requiring any license, of course with certain transmit power followed and without interfering with another frequency band.

With a growing demand for mobile data communication, research has been carried out in the industry to extend cellular mobile communication technologies to an unlicensed frequency band. For example, in order to extend the Fifth-generation (5G) mobile communication technology, also known as the new radio (NR) technology, to an unlicensed frequency band, the 3rd Generation Partnership Project (3GPP) organization passed a 5G research project "Study on NR-based Access to Unlicensed Spectrum", NR-U for short, in order to make the NR meet a regulatory requirement on an unlicensed frequency band through the research of the project, and ensure peaceful coexistence with another access technology operating on the unlicensed frequency band.

Embodiments of the present disclosure provide a random access scheme based on NR-U research, which can be used in a wireless communication system to implement a connection between a terminal and a base station.

Refer to FIG. 1. FIG. 1 is a diagram of a structure of a wireless communication system according to some illustrative embodiments. As shown in FIG. 1, a mobile communication system is a communication system based on a cellular mobile communication technology. The mobile communication system may include a plurality of terminals 110 and a plurality of base stations 120.

A terminal 110 may be equipment that provides voice and/or data connectivity to a user. The terminal 110 may communicate with one or more core networks via a Radio Access Network (RAN). The terminal 110 may be a terminal of an Internet of Things, such as sensor equipment, a mobile phone (or referred to as a "cellular" phone), and a computer having an Internet of Things terminal. For example, the terminal may be a fixed device, a portable device, a pocket-sized device, a handheld device, a computer built-in device, or an onboard device, such as a station (STA), a subscriber unit, a subscriber station, a mobile station, a mobile, a remote station, an access point, a remote terminal, an access terminal, a user terminal, a user agent, a user device, or User Equipment (UE). Alternatively, the terminal 110 may also be equipment of an unmanned aerial vehicle.

A base station 120 may be network-side equipment in a wireless communication system. The wireless communication system may be the 4th generation mobile communication (4G) system, also known as a Long Term Evolution (LTE) system. Alternatively, the wireless communication system may be a 5 G system, also known as a new radio (NR) system. Alternatively, the wireless communication system may be a system of the next generation of a 5G system.

A base station 120 may be an evolved NodeB (eNB) used in a 4G system. Alternatively, the base station 120 may be a gNodeB (gNB) using a centralized distributed architecture in a 5G system. A base station 120 using a centralized distributed architecture generally includes a central unit (CU) and at least two distributed units (DU). A protocol stack having a Packet Data Convergence Protocol (PDCP) layer, a Radio Link Control (RLC) layer, and a Media Access Control (MAC) layer is arranged in the CU. A Physical (PHY) layer protocol stack is provided in a DU, and a specific implementation of the base station 120 is not limited in embodiments of the present disclosure.

A wireless connection between a base station 120 and a terminal 110 may be established via a wireless air interface. In various implementations, the wireless air interface is a wireless air interface based on a fourth generation mobile communication network technology (4G) standard. Alternatively, the wireless air interface is a wireless air interface based on a fifth generation mobile communication network technology (5G) standard, such as when the wireless air interface is a new air interface. Alternatively, the wireless air interface may be a wireless air interface based on a mobile communication network technology standard of the next generation of 5G.

Alternatively, the wireless communication system may further include network management equipment 130.

A plurality of base stations 120 are connected respectively to the network management equipment 130. The network management equipment 130 may be core network equipment in the wireless communication system. For example, the network management equipment 130 may be a Mobility Management Entity (MME) in an Evolved Packet Core (EPC). Alternatively, the network management equipment may be other core network equipment, such as a Serving GateWay (SGW), a Public Data Network GateWay (PGW), a Policy and Charging Rules Function (PCRF), or a Home Subscriber Server (HSS), etc. A form of implementing the network management equipment 130 is not limited in embodiments of the present disclosure.

Figure 2:
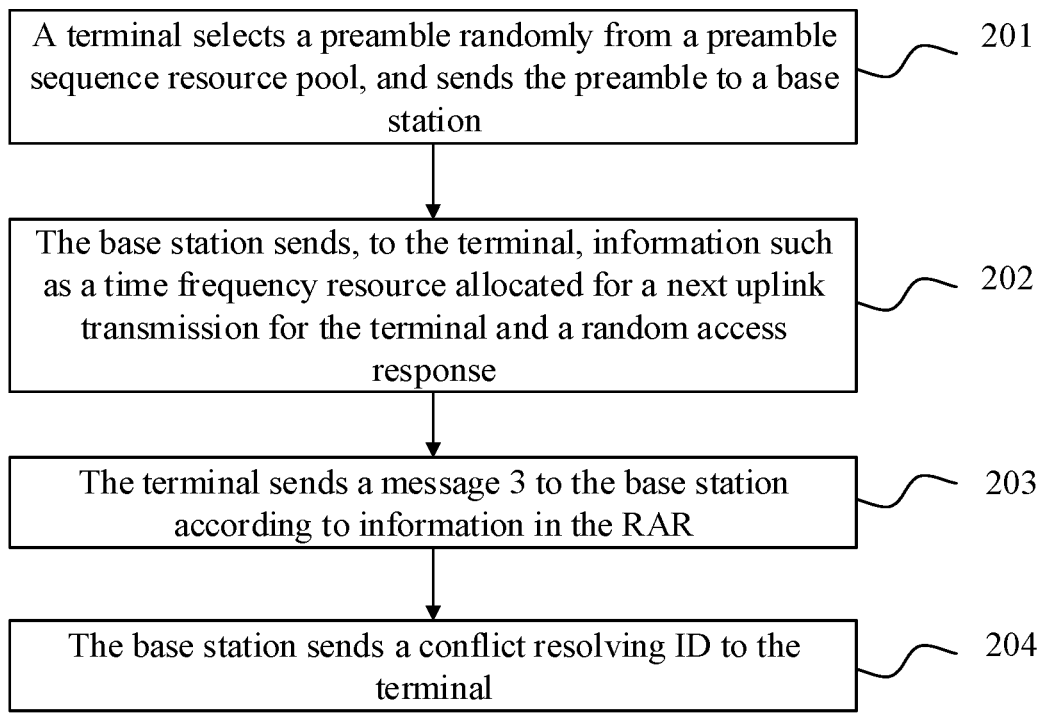
FIG. 2 is a flowchart of random access according to embodiments of the present disclosure.

In a possible implementation, a terminal and a base station in the wireless communication system may have capability of using an unlicensed frequency band (such as NR-U capability) based on a cellular mobile communication technology. Correspondingly, a terminal having a capability of using an unlicensed frequency band based on a cellular mobile communication technology may initiate a random access request to a base station having the same capability on the unlicensed frequency band. Refer to FIG. 2. FIG. 2 is a flowchart of random access based on contention according to embodiments of the present disclosure.

In S201, a terminal selects a preamble randomly from a preamble sequence resource pool, and sends the preamble to a base station. A message containing a preamble is also referred to as a random access message 1 (MSG1). The base station performs correlation detection on the received signal to identify the preamble sent by the user.

In S202, the base station sends a Random Access Response (RAR) to the terminal. The RAR is also referred to as a random access message 2 (MSG2). The RAR includes information such as a random access preamble identifier, a timing advance command determined according to an estimated delay between the terminal and the base station, a Temporary Cell-Radio Network Temporary Identifier (TC-RNTI), a time frequency resource allocated for a next uplink transmission for the terminal, etc.

In S203, the terminal sends a random access message 3 (MSG3) to the base station according to information in the RAR. The MSG3 includes information such as a terminal identifier and a Radio Resource Control (RRC) link request. The terminal identifier may be an identifier corresponding uniquely to the terminal. For example, when the terminal is a terminal in an idle state, the terminal identifier may be an International Mobile Subscriber Identification Number (IMSI) of the terminal. When the terminal is in a connected state (CONNECTED state), the terminal identifier may be a Cell-Radio Network Temporary Identifier (C-RNTI) allocated to the terminal.

In S204, the base station sends a conflict resolving identifier (also referred to as MSG4) to the terminal. The conflict resolving identifier includes a terminal identifier that has won in the conflict resolution. After the terminal has detected the identifier of the terminal, if the terminal is in an idle state, the terminal upgrades the TC-RNTI to C-RNTI, transmits an acknowledgement (ACK) signal to the base station, completes the random access process, and waits for scheduling by the base station.

Compared to a contention-based random access process, a non-contention-based random access process requires no contention resolving process, but only the first two steps of the contention-based random access process. That is, with the non-contention access process, the process of random access to the base station may be completed via the S201 and the S202.

Figure 3:
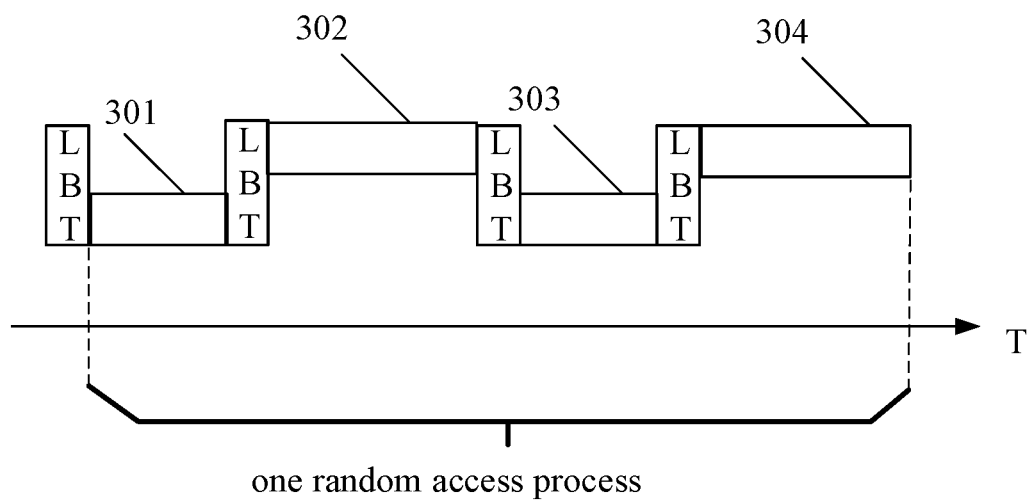
FIG. 3 is a diagram of a random access process according to embodiments of the present disclosure.

At present, in study of random access of the NR-U, a terminal may initiate random access with a base station, a specific flow of which may be as shown in FIG. 2. Please refer to FIG. 3. FIG. 3 is a diagram of a random access process according to embodiments of the present disclosure. As shown in FIG. 3, the random access process includes a MSG1 channel resource 301, MSG2 channel resource 302, a MSG3 channel resource 303, and a MSG4 channel resource 304. Further, before the arrival of the time domain unit for transmitting the MSG1, the terminal may monitor the MSG1 channel resource 301 in an LBT mode. When it is acquired that the channel resource 301 for sending the MSG1 is idle, the terminal may send the MSG1 on the channel resource corresponding to the message, and receive the MSG2 sent by the base station within the MSG2 channel resource 302. Alternatively, the terminal may continuously monitor the RAR returned by the base station within a RAR time window. When the terminal receives a RAR for the terminal, the terminal may monitor whether the MSG3 channel resource 303 is idle in an LBT mode before the arrival of the time domain unit for sending the MSG3. When the MSG3 channel resource 303 is idle, the terminal may send the MSG3 on the channel resource corresponding to the message, and receive the MSG4 sent by the base station in the MSG4 channel resource 304. When the terminal receives a MSG4 for the terminal, it may be declared that the random access is successful.

Figure 4:
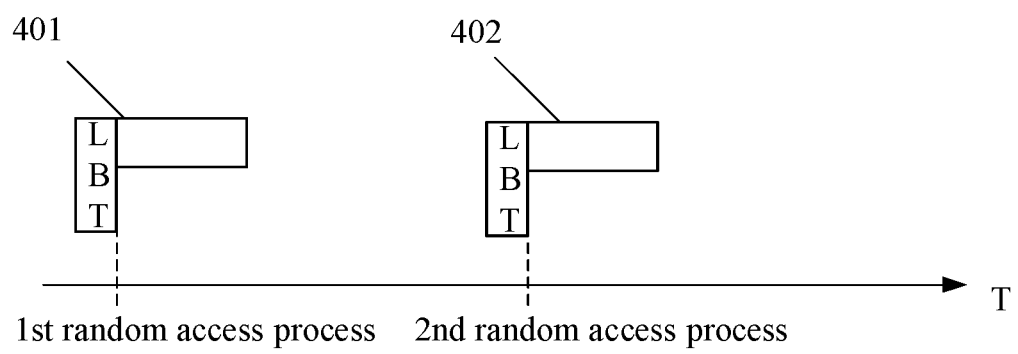
FIG. 4 is a diagram of a random access process according to embodiments of the present disclosure.

In another possible mode, in the random access process, when the terminal monitors the MSG1 channel resource 301 in the LBT mode to obtain that the channel resource 301 for sending the MSG1 is busy, the terminal may miss this random access opportunity and wait for initiation of the next random access. Please refer to FIG. 4. FIG. 4 is a diagram of a random access process according to embodiments of the present disclosure. As shown in FIG. 4, the random access process includes a first MSG1 channel resource 401 and a second MSG channel resource 402. The terminal may send the MSG1 on the first MSG1 channel resource 401. When terminal transmission fails or the random access initiated via the first MSG1 channel resource 401 fails due to another reason, the terminal has to wait, and resend the MSG1 upon the arrival of the second MSG channel resource 402, so as to restart the random access. That is, in one random access process, the terminal has only one opportunity to send a random access preamble to the base station. Staring from S201 till the end of the entire random access process, the terminal can send the random access preamble to the base station only in S201. When the terminal does not send the random access preamble in S201, or the base station does not receive the random access preamble sent by the terminal, or the base station does not return a random access response RAR, or the terminal does not receive the random access response RAR returned by the base station, etc., the random access process may fail, and the terminal has to re-initiate random access. The time interval between the two initiations of random access by the terminal is excessively large, impacting the efficiency in NR-U-based random access by the terminal.

Figure 5:
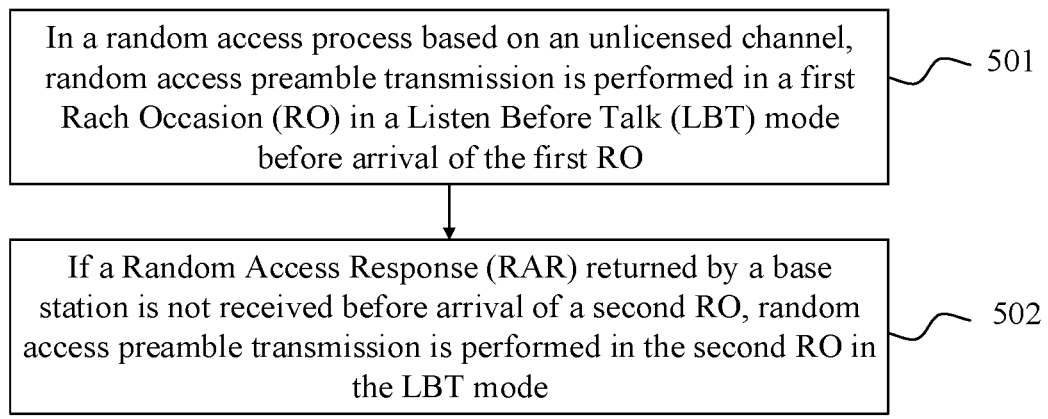
FIG. 5 is a flowchart of a method for transmitting a random access message according to embodiments of the present disclosure.

In view of this, the present disclosure provides a method for sending a random access preamble. Please refer to FIG. 5. FIG. 5 is a flowchart of a method for transmitting a random access message according to embodiments of the present disclosure. The method may be applied to a process of NR-U random access by a terminal to a base station in the wireless communication system shown in FIG. 1. The method may be performed by a base station supporting a NR-U capability in the wireless communication system. As shown in FIG. 5, the method may include steps as follows.

In S501, in a random access process based on an unlicensed channel, random access preamble transmission is performed in a first Rach Occasion (RO) in a Listen Before Talk (LBT) mode before arrival of the first RO.

The first RO is a first RO selected in the random access process.

In S502, if a Random Access Response (RAR) returned by a base station is not received before arrival of a second RO, random access preamble transmission is performed in the second RO in the LBT mode.

The second RO is any one RO within a RAR time window corresponding to the random access process. The RAR time window is a period of a predetermined duration starting after the first RO.

Alternatively, the method further includes a step as follows.

In the random access process, the RAR returned by the base station starting may be monitored upon a first successful random access preamble transmission.

Alternatively, the method further includes a step as follows.

If the RAR returned by the base station is received before arrival of the second RO, monitoring of the RAR returned by the base station may be ended after the RAR returned by the base station has been monitored for a first time within the RAR time window.

Alternatively, the method further includes a step as follows.

Random access preamble transmission in a subsequent RO may be stopped after the RAR returned by the base station has been monitored for the first time within the RAR time window.

Alternatively, random access preamble transmission is performed in the first RO in the LBT mode as follows.

Random access preamble transmission may be performed in the first RO in an LBT mode without random backoff.

Alternatively, random access preamble transmission is performed in the first RO in the LBT mode as follows.

If it is monitored that a target frequency domain interval is in an idle state within a preset duration before start of the first RO, a random access preamble may be sent on one time-frequency unit of at least two time-frequency units corresponding to the first RO.

The target frequency domain interval may be a frequency domain interval including a frequency band in which the at least two time-frequency units are located.

Alternatively, the at least two time-frequency units are frequency division multiplexed in an unlicensed channel resource pool.

Alternatively, the at least two time-frequency units may be frequency division multiplexed and time division multiplexed in the unlicensed channel resource pool.

Alternatively, before performing random access preamble transmission in the first RO in the LBT mode, the method further includes a step as follows.

Random access configuration information sent by the base station may be received. The random access configuration information may be configured to indicate an RO available to the terminal and a duration of the RAR time window.

To sum up, with the present disclosure, by adding a second RO in a random access process in an unlicensed channel, a terminal is allowed to send a random access preamble also through the second RO. That is, the terminal may send the random access preamble multiple times in one random access process, which saves the time for the terminal to wait for start of the next random access after a failed random access preamble transmission in the first RO, thereby reducing the delay in NR-U-based random access, improving the efficiency in NR-U-based random access.

In a possible implementation, in the wireless communication system shown in FIG. 1, the base station supporting the NR-U capability may broadcast a system message through unicast radio resource control RRC signaling. A corresponding terminal supporting the NR-U capability may receive the system message broadcast by the base station. A terminal that has to access the base station may generate the MSG1 for contention-based random access according to information carried in the system message, and send the MSG1 to the base station, to start the flow of a random access of the base station based on an unlicensed channel.

Figure 6:
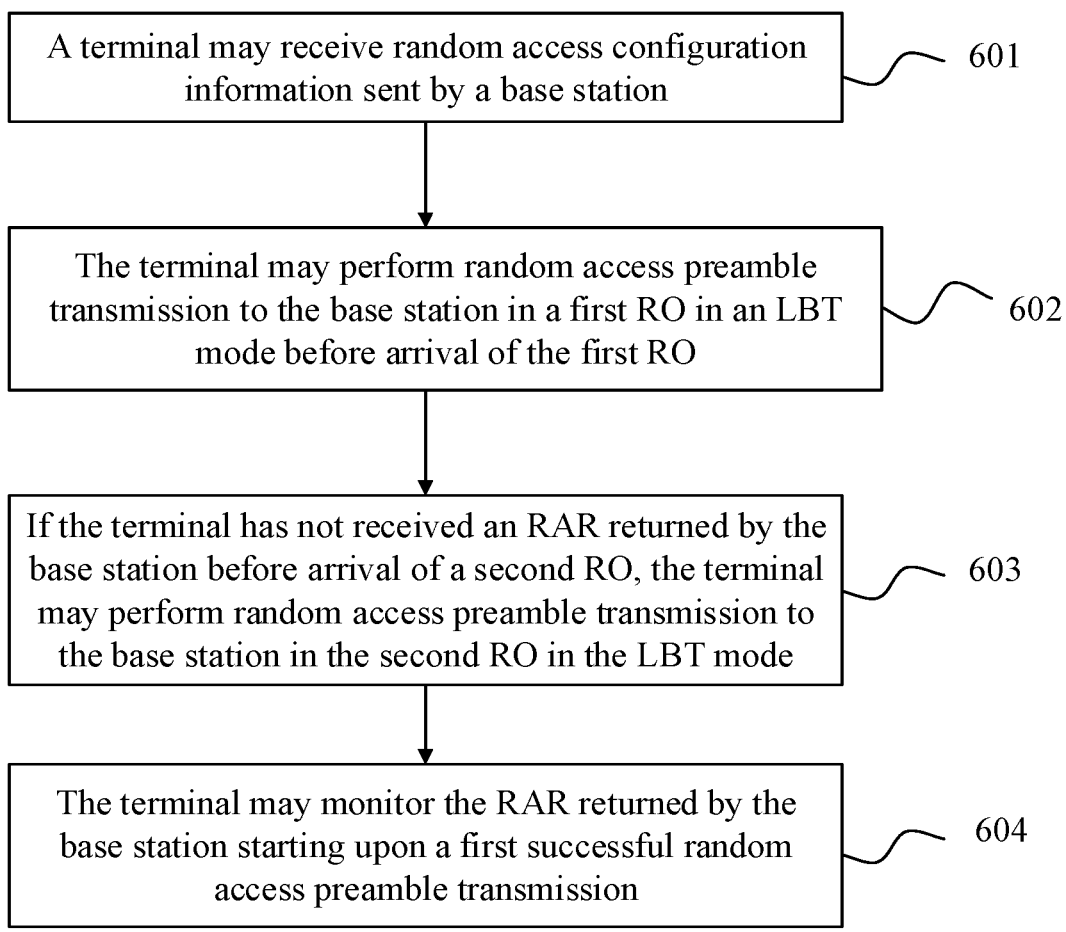
FIG. 6 is a flowchart of a method for transmitting a random access message according to embodiments of the present disclosure.

FIG. 6 is a flowchart of a method for transmitting a random access message according to embodiments of the present disclosure. As shown in FIG. 6, the method for transmitting a random access message may be applied to the wireless communication system shown in FIG. 1. The method may include steps as follows.

In S601, a terminal may receive random access configuration information sent by a base station.

The random access configuration information is configured to indicate at least one of a random access occasion RO available to the terminal or a duration of the RAR time window. The RAR time window is a period of a predetermined duration starting after the first RO. The first RO may be a first RO in one random access process.

In a possible implementation, the base station may send the system message carrying the random access configuration information through broadcast. Correspondingly, the terminal may receive the system message broadcast by the base station through a receiving component, obtain the random access configuration information carried in the system message through a parsing method of the terminal, and further obtain a time-frequency resource on which the terminal may send the random access preamble, and a time-frequency resource on which the terminal may receive the RAR returned by the base station. That is, the random access configuration information may indicate an RO available to the terminal and the duration of the time window for receiving the RAR returned by the base station.

In a possible implementation, when determining to start a random access process, the terminal may select, from RO resources included in the random access configuration information sent by the base station, a first RO that is to come as the first RO. For example, the terminal may obtain information on time of each RO that is to come according to the time-frequency resource of each RO in the random access configuration information obtained, and select an RO closest to the present time as the first RO in the present random access process.

After the terminal has started a random access process, the RO that arrives first is the first RO. The duration of the period of the predetermined duration (i.e., the RAR time window) starting after the first RO may be preconfigured by developing personnel or operation and maintenance personnel, or may be sent through a system message broadcast by the base station. The terminal may determine the RAR time window of the response according to the RO that arrives first and the predetermined period, and receive the RAR returned by the base station within the obtained RAR time window.

Alternatively, the system message broadcast by the base station may include a Master Information Block (MIB) or a System Information Block (SIB). The MIB or the SIB may further carry preamble information, etc. The terminal may extract the preamble information therein by parsing and configure the preamble information to MAC. The MAC may randomly select a Preamble index in the preamble set according to information such as the path loss, etc., and configure the Preamble index to the physical layer. The physical layer may generate a valid random access preamble according to the Preamble index of the MAC by looking up a table or via a formula, and send the valid random access preamble to the base station on the time-frequency resource corresponding to response of the RO that arrives. The base station may receive the random access preamble sent by the terminal on the corresponding time-frequency resource.

Alternatively, a plurality of terminals may send random access preambles to the base station on one RO resource, and the base station may receive the random access preambles sent by the plurality of terminals.

In S602, the terminal may perform random access preamble transmission to the base station in a first RO in an LBT mode before arrival of the first RO.

In a possible implementation, before arrival of the first RO, the terminal may first detect, in the LBT mode, whether the present channel is idle, that is, whether another terminal is sending a random access preamble in the first RO. When the terminal detects that the present channel is idle, the terminal may send a valid random access preamble generated in S601 to the base station in the RO.

Alternatively, the LBT mode used by the terminal may be an LBT mode that requires no random backoff. That is, there may be a level 1 LBT and a level 2 LBT. In level 1 LBT, the terminal does not have to perform Clear Channel Assessment (CCA) detection before sending uplink data. In level 2 LBT, the terminal has to perform CCA detection for a predetermined duration (e.g., to perform CCA detection for 25 microseconds) before sending uplink data. The terminal may perform LBT detection for the arriving RO in either LBT mode.

In a possible implementation, the LBT mode executed by the terminal may be indicated by the indication information in the system message sent by the base station. That is, when parsing the system message, the terminal may learn, through the indication information, which LBT mode to use in detecting the RO. For example, the indication information includes information such as a contention window or an identifier corresponding to a corresponding LBT type. The terminal learns, according to information carried in the indication information, which LBT mode the terminal is to use to detect the RO.

In a possible implementation, if the terminal monitors that a target frequency domain interval is in an idle state within a preset duration before start of the first RO, the terminal may send a random access preamble on one time-frequency unit of at least two time-frequency units corresponding to the first RO. The target frequency domain interval may be a frequency domain interval including a frequency band in which the at least two time-frequency units are located.

Alternatively, for example, the terminal determines to use Level 2 LBT for LBT detection. Before arrival of the first RO, the terminal may perform CCA detection for a predetermined duration, and when it is detected that the target frequency domain interval is in the idle state, the terminal may send a random access preamble within a time-frequency resource corresponding to the first RO. When it is detected that the target frequency domain interval is in a busy state, the terminal sends no random access preamble and performs no random backoff wait within the time-frequency resource corresponding to the first RO. Instead, the terminal repeats the CCA detection for the predetermined period before arrival of the next RO.

Alternatively, the at least two time-frequency units are frequency division multiplexed in an unlicensed channel resource pool. Alternatively, the at least two time-frequency units are frequency division multiplexed and time division multiplexed in the unlicensed channel resource pool. Alternatively, the at least two time-frequency units are time division multiplexed in the unlicensed channel resource pool.

Figure 7:
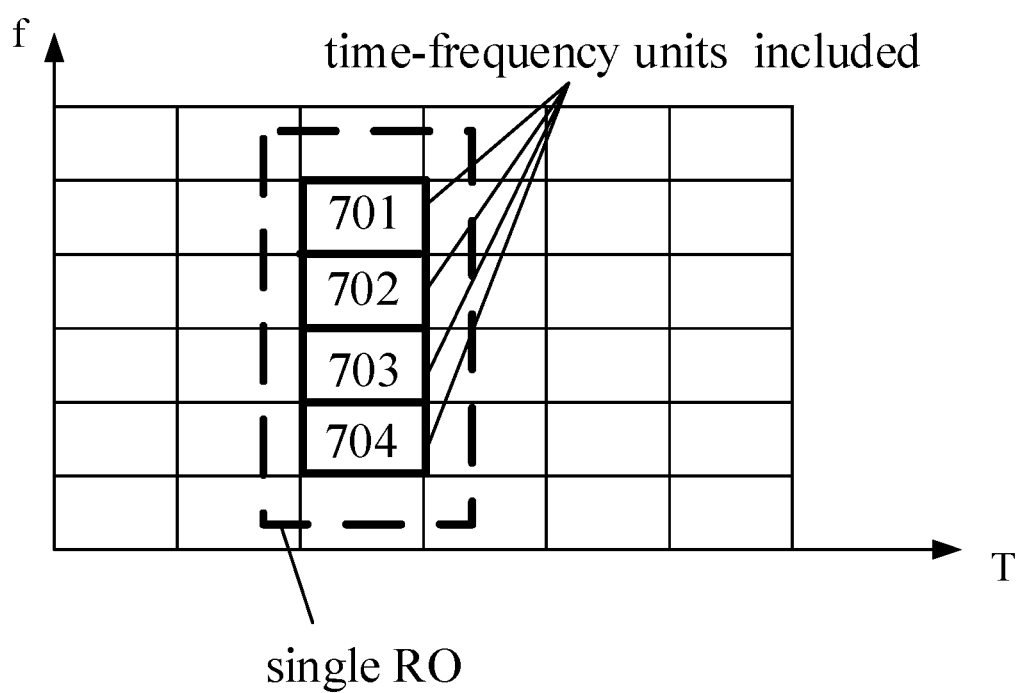
FIG. 7 is a diagram of a time-frequency resource of a first RO including four time-frequency units according to embodiments of the present disclosure.
Figure 8:
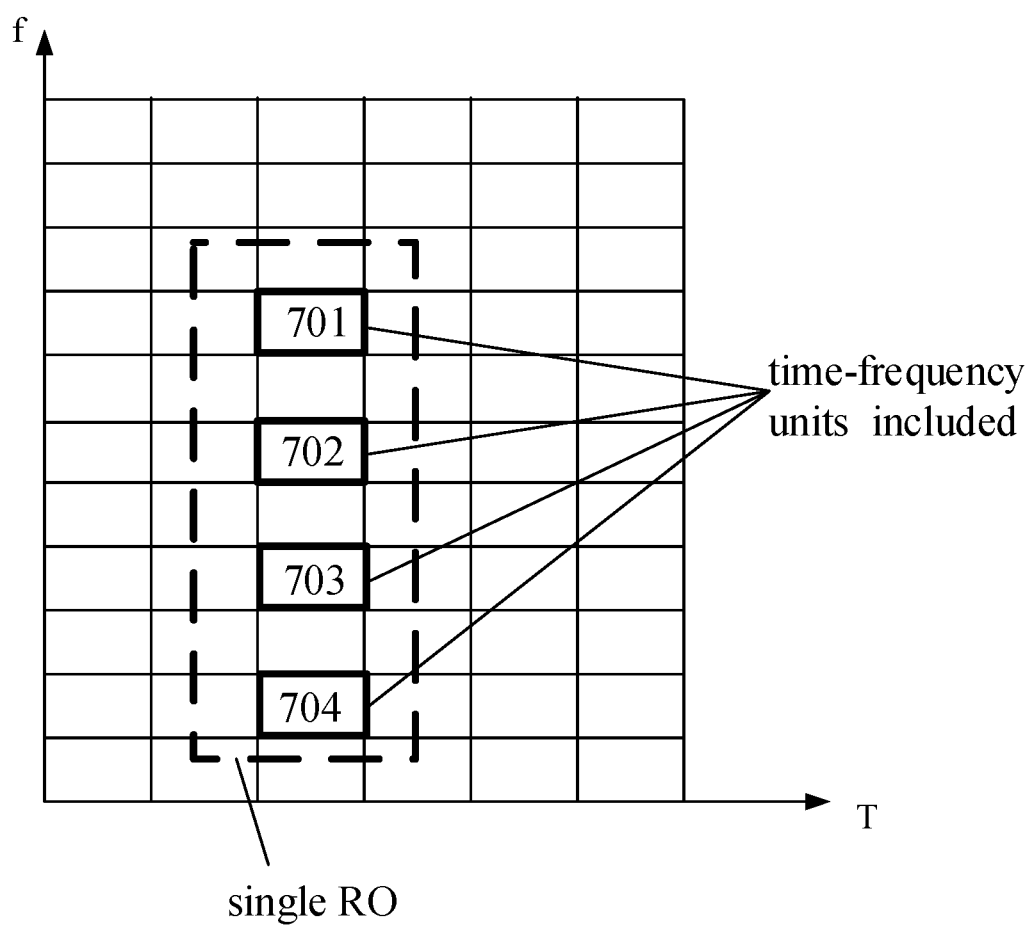
FIG. 8 is a diagram of a time-frequency resource of a first RO including four time-frequency units according to embodiments of the present disclosure.

That is, the first RO corresponds to at least two time-frequency units. In a possible implementation, please refer to FIG. 7. FIG. 7 is a diagram of a time-frequency resource of a first RO including four time-frequency units according to embodiments of the present disclosure. A first time-frequency unit 701, a second time-frequency unit 702, a third time-frequency unit 703, and a fourth time-frequency unit 704 may be included. The first time-frequency unit 701, the second time-frequency unit 702, the third time-frequency unit 703, and the fourth time-frequency unit 704 may be four time-frequency units located on the same time domain and on different frequency domains. That is, the first time-frequency unit 701, the second time-frequency unit 702, the third time-frequency unit 703, and the fourth time-frequency unit 704 adopt frequency division multiplexing in the unlicensed channel resource pool. When the terminal monitors, within the preset duration before start of the first RO, that frequency domain intervals corresponding to the time-frequency units are in the idle state, the terminal may randomly select a time-frequency unit from the first time-frequency unit 701, the second time-frequency unit 702, the third time-frequency unit 703, and the fourth time-frequency unit 704, and send a random access preamble on the time-frequency unit selected. Alternatively, the first time-frequency unit 701, the second time-frequency unit 702, the third time-frequency unit 703, and the fourth time-frequency unit 704 may be discontinuous in the frequency domain. Refer to FIG. 8. FIG. 8 is a diagram of a time-frequency resource of a first RO including four time-frequency units according to embodiments of the present disclosure. As shown in FIG. 8, a first time-frequency unit 701, a second time-frequency unit 702, a third time-frequency unit 703, and a fourth time-frequency unit 704 are included. A process in which a terminal selects to send a random access preamble on one of the time-frequency units is similar in principle to selection from the four time-frequency units that are continuous in the frequency domain, which is not repeated here.

Figure 9:
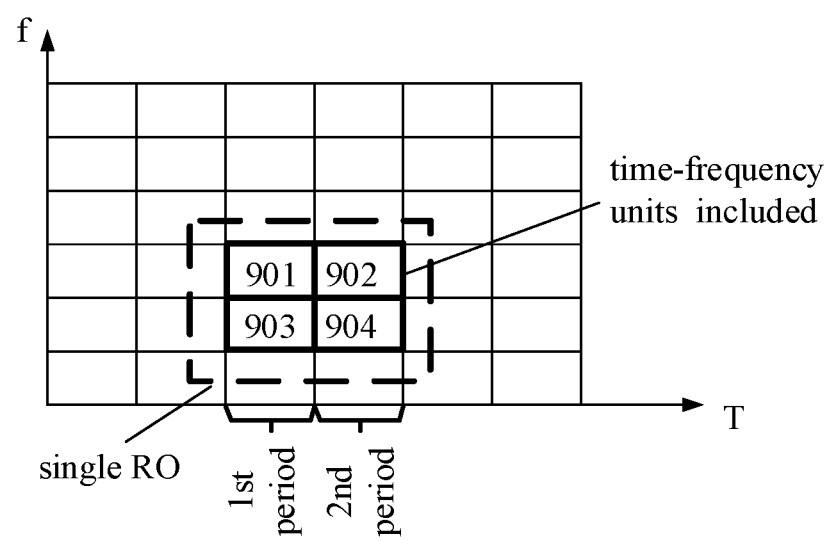
FIG. 9 is a diagram of a time-frequency resource of a first RO including four time-frequency units according to embodiments of the present disclosure.

In a possible implementation, when resources allocated are insufficient in case the at least two time-frequency units use frequency division multiplexing as shown in FIG. 7, time division multiplexing may also be used in addition to frequency division multiplexing. Please refer to FIG. 9. FIG. 9 is a diagram of a time-frequency resource of a first RO including four time-frequency units according to embodiments of the present disclosure. Referring to FIG. 9, a first time-frequency unit 901, a second time-frequency unit 902, a third time-frequency unit 903, and a fourth time-frequency unit 904 are included. The first time-frequency unit 901 and the third time-frequency unit 903 are located in a first period, and the second time-frequency unit 902 and the fourth time-frequency unit 904 are located in a second period. The terminal may monitor, within a preset duration before a period, whether a frequency domain interval corresponding to a time-frequency unit in the period is idle. When the frequency domain interval corresponding to each time-frequency unit in the monitored period is in the idle state, the terminal randomly selects one time-frequency unit among the time-frequency units in the period, and sends a random access preamble on the time-frequency unit. For example, in FIG. 9, when the first RO arrives, the terminal may monitor, in a preset duration before the first period, whether the frequency domain interval corresponding to each time-frequency unit in the first period is idle. When frequency domain intervals corresponding to the first time-frequency unit 901 and the third time-frequency unit 903 are both idle, the terminal may randomly select one time-frequency unit from the first time-frequency unit 901 and the third time-frequency unit 903, and send the random access preamble on the selected time-frequency unit. When at least one of the time-frequency units in the first period is not in the idle state, the terminal may repeat, before the arrival of the second period, the monitoring before the arrival of the first period, randomly select one of the time-frequency units in the second period according to the result of the monitoring, and send a random access preamble on the selected time-frequency unit. Refer to the selection in the first period for specific time-frequency unit selection, which is not repeated here.

Figure 10:
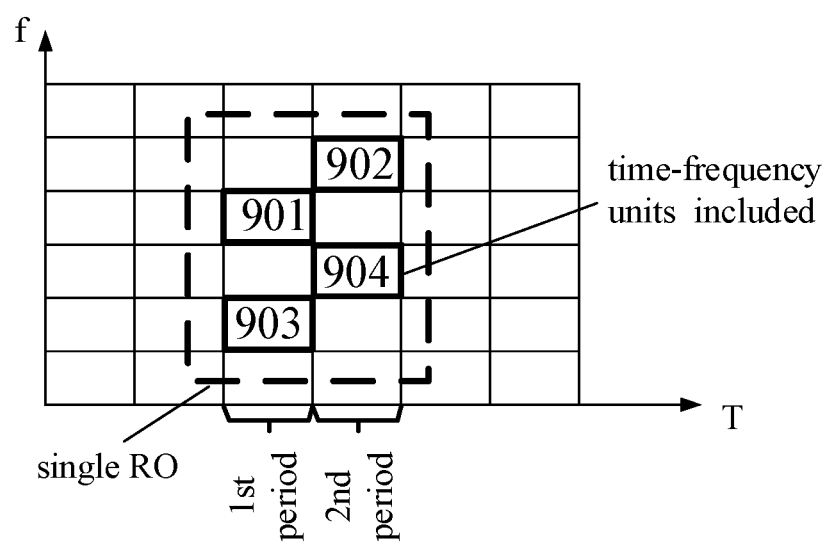
FIG. 10 is a diagram of a time-frequency resource of a first RO including four time-frequency units according to embodiments of the present disclosure.

Alternatively, the frequency division multiplexed and time division multiplexed time-frequency units shown in FIG. 9 may be time-frequency units discontinuous on the frequency domain, as shown in FIG. 10. FIG. 10 is a diagram of a time-frequency resource of a first RO including four time-frequency units according to embodiments of the present disclosure. As shown in FIG. 10, a first time-frequency unit 901, a second time-frequency unit 902, a third time-frequency unit 903, and a fourth time-frequency unit 904 are included. The first time-frequency unit 901 and the third time-frequency unit 903 are located in a first period, and the second time-frequency unit 902 and the fourth time-frequency unit 904 are located in a second period. The first time-frequency unit 901 and the third time-frequency unit 903 in the first period may be discontinuous in the frequency domain, and the second time-frequency unit 902 and the fourth time-frequency unit 904 in the second period may also be discontinuous in the frequency domain. A mode in which the terminal randomly selects one time-frequency unit in the mode of time-frequency unit allocation shown in FIG. 10 is similar to the case of continuity in frequency domain, which is not repeated here. Alternatively, the discontinuity of the time-frequency resource of the first RO in the frequency domain may also be discontinuity in the first period and continuity in the second period.

Figure 11:
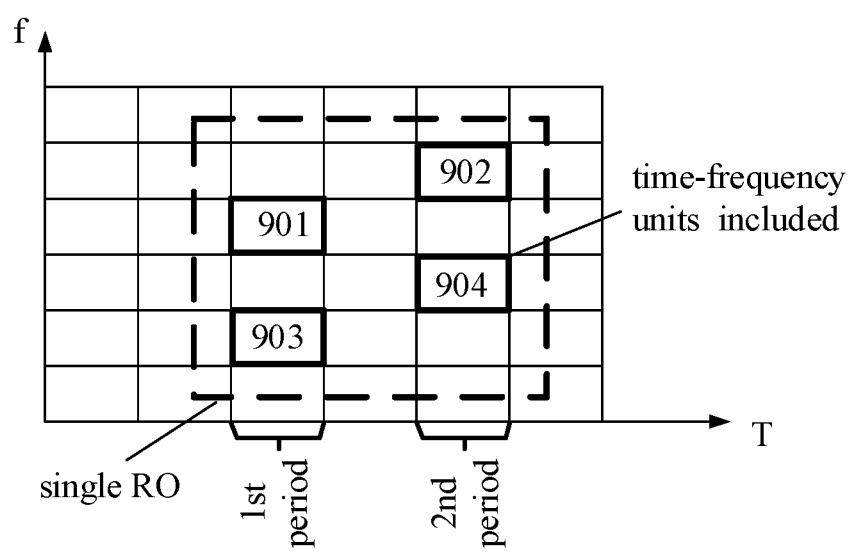
FIG. 11 is a diagram of a time-frequency resource of a first RO including four time-frequency units according to embodiments of the present disclosure.

Alternatively, the first period and the second period in which the time-frequency units are located as shown in FIG. 10 may also be discontinuous, as shown in FIG. 11. FIG. 11 is a diagram of a time-frequency resource of a first RO including four time-frequency units according to embodiments of the present disclosure. As shown in FIG. 11, the first period and the second period are not continuous. That is, the time-frequency units included in the first RO may be in different periods and in different frequency domain intervals. Embodiments of the present disclosure do not limit the form of the time-frequency units used in an RO available to the terminal. In addition, embodiments of the present disclosure are illustrated merely with the four time-frequency units and two periods. A configuration of another number may be used in practical application.

In S603, if the terminal has not received an RAR returned by the base station before arrival of a second RO, the terminal may perform random access preamble transmission to the base station in the second RO in the LBT mode.

The second RO is any one RO within a RAR time window corresponding to the random access process. The RAR time window is a period of a predetermined duration starting after the first RO.

In a possible implementation, when the terminal performs LBT detection on the first RO, the terminal finds that the time-frequency resource of the first RO is in an idle state. The terminal sends a random access preamble within the time-frequency resource of the first RO. The terminal may monitor a RAR returned by the base station in the RAR time window. Before arrival of the second RO, if the terminal receives no RAR returned by the base station, the terminal may detect the second RO in the LBT mode. When the second RO is in an idle state, the terminal may again send a random access preamble within the time-frequency resource of the second RO.

Alternatively, the random access preamble resent by the terminal within the time-frequency resource of the second RO may be different from the random access preamble obtained before arrival of the first RO. That is, the terminal may select to send another random access preamble from the random access preamble resource pool. Alternatively, the LBT mode used by the terminal to detect the LBT before arrival of the second RO may be different from the LBT mode used by the terminal to detect the first RO. That is, the terminal may detect the first RO via the level 2 LBT, detect the second RO via the level 1 LBT, etc., which is not limited in embodiments of the present disclosure.

Figure 12:
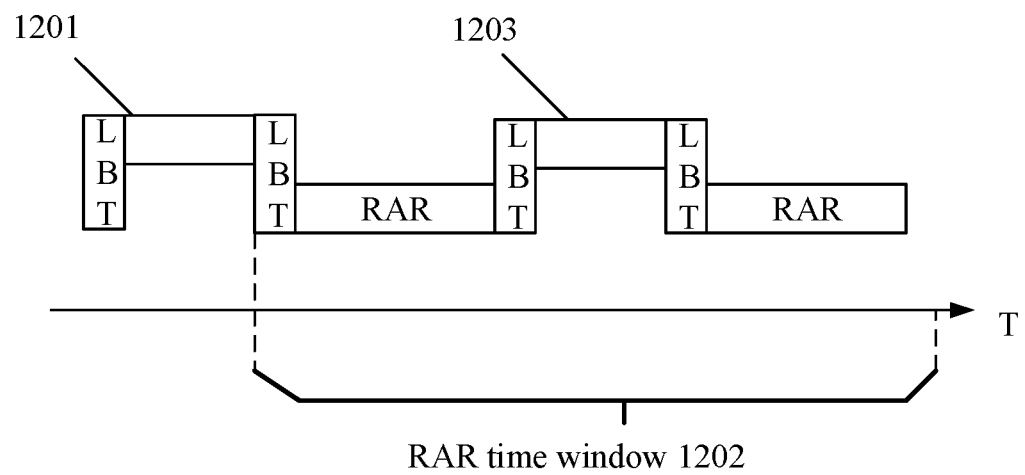
FIG. 12 is a diagram of random access preamble transmission by a terminal according to embodiments of the present disclosure.

FIG. 12 is a diagram of random access preamble transmission by a terminal according to embodiments of the present disclosure. As shown in FIG. 12, a first RO 1201, a RAR time window 1202, and a second RO 1203 are included. If the terminal receives no RAR returned by the base station before arrival of the second RO 1203, the terminal may send another random access preamble within a time-frequency resource of the second RO 1203. It should be noted that when the terminal resends the random access preamble within the time-frequency resource of the second RO 1203, the terminal may continue to monitor a RAR returned by the base station. Alternatively, the RAR time window 1202 may include a plurality of ROs, such as a third RO, a fourth RO, etc. If the terminal receives no RAR returned by the base station before the respective time points of arrival of the third RO and the fourth RO, the terminal may also send random access preambles within the time-frequency resources corresponding to the third RO and the fourth RO, a specific process of which is similar to that of the second RO, which is not repeated here again.

In S604, the terminal may monitor the RAR returned by the base station starting upon a first successful random access preamble transmission.

After the terminal has successfully sent a random access preamble within any available RO, the terminal may start to monitor a RAR returned by the base station. Alternatively, there may be no time interval between the time when the terminal starts to monitor the RAR returned by the base station and the time when the random access preamble is successfully sent. That is, the terminal may start to monitor the RAR returned by the base station upon successfully sending the random access preamble. Of course, there may be a time interval between the time when the terminal starts to monitor the RAR returned by the base station and the time when the random access preamble is successfully sent. The time interval may be determined by a communication protocol between the terminal and the base station. For example, the terminal may monitor the RAR returned by the base station from the start of the third sub-frame after the terminal has successfully sent the random access preamble.

In a possible implementation, when performing LBT detection on the first RO, the terminal finds that the time-frequency resource of the first RO is in a busy state. Then, the terminal sends no random access preamble in the time-frequency resource of the first RO. In this case, the RAR time window may arrive. However, the terminal does not monitor the RAR returned by the base station in the RAR time window. When the second RO arrives in the RAR time window arrives, the terminal may also perform LBT detection on the second RO. In addition, the terminal may learn that the terminal receives no RAR returned by the base station before arrival of the second RO. Then, if the result of the LBT detection on the second RO shows that the time-frequency resource of the second RO is in the idle state, the terminal may send another random access preamble in the time-frequency resource of the second RO. When the sending succeeds, the terminal may start to monitor a RAR returned by the base station.

Figure 13:
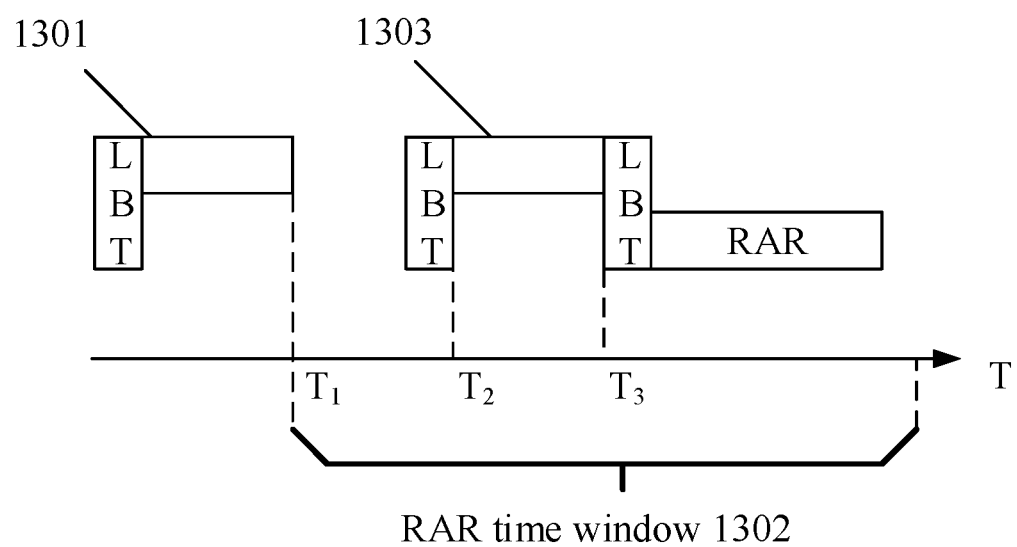
FIG. 13 is a diagram of random access preamble transmission by a terminal according to embodiments of the present disclosure.

For example, FIG. 13 is a diagram of random access preamble transmission by a terminal according to embodiments of the present disclosure. As shown in FIG. 13, a first RO 1301, a RAR time window 1302, and a second RO 1303 are included. The terminal may perform LBT detection before the first RO 1301 and the second RO 1303. When it is detected that the first RO 1301 is in a busy state, the terminal sends no random access preamble within a time-frequency resource of the first RO 1301. The terminal performs LBT detection on the second RO 1303 upon arrival of the second RO 1303 in the RAR time window 1302. When it is detected that the second RO is idle, and the terminal successfully sends a random access preamble within a time-frequency resource of the second RO 1303, the terminal may start to monitor the RAR returned by the base station since the end of the second RO 1303, rather than monitoring the RAR returned by the base station starting from the end of the first RO 1301. That is, rather than performing monitoring from T1 to T2 shown in FIG. 13, the terminal starts to monitor the RAR returned by the base station starting from T3.

Figure 14:
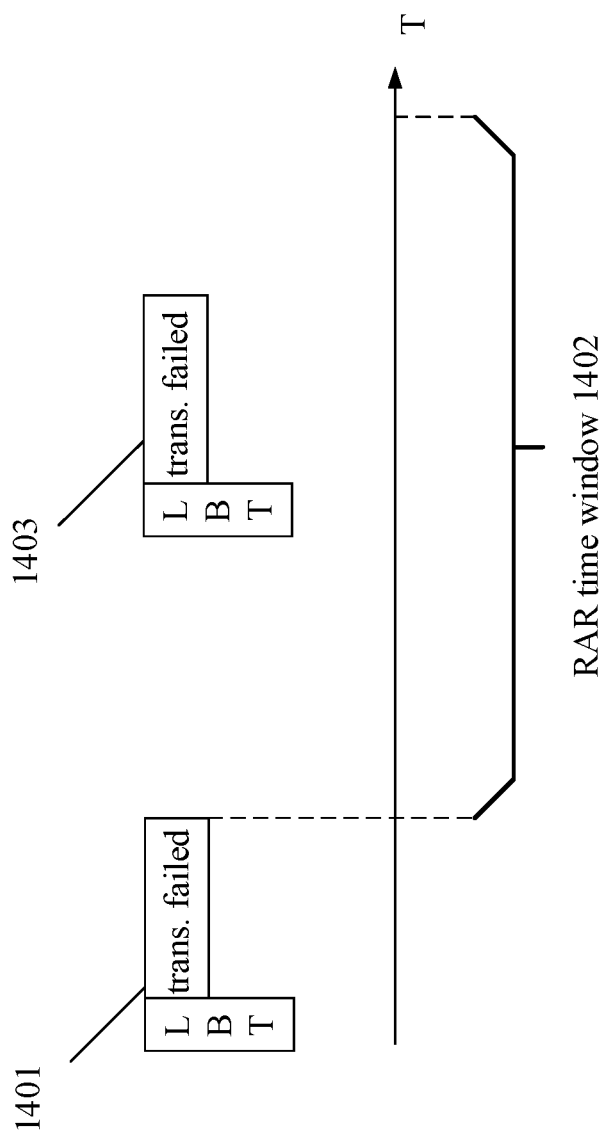
FIG. 14 is a diagram that random access preamble transmissions by a terminal all fail, according to embodiments of the present disclosure.

Alternatively, each random access preamble sent by the terminal in an RO time-frequency resource included in the RAR time window may fail. In this case, the present random access process of the terminal fails and the terminal waits to initiate the next random access. FIG. 14 is a diagram that random access preamble transmissions by a terminal all fail, according to embodiments of the present disclosure. As shown in FIG. 14, a first RO 1401, a RAR time window 1402, and a second RO 1403 are included. For example, the RAR time window 1402 may include but one RO. When the terminal fails to send a random access preamble in a time-frequency resource corresponding to the first RO 1401, the terminal may send a random access preamble again in a time-frequency resource corresponding to the second RO 1403. When the random access preamble sending also fails, the random access by the terminal fails, and the terminal may have to wait for start of the next random access.

Figure 15:
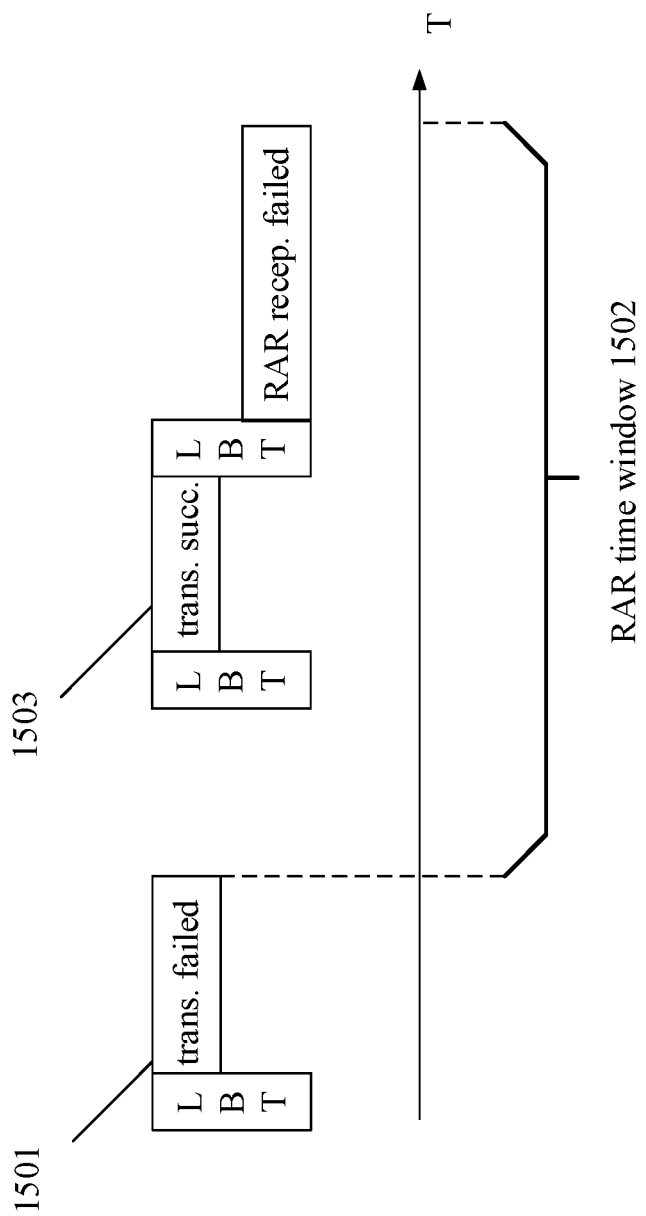
FIG. 15 is a diagram that random access by a terminal fails, according to embodiments of the present disclosure.

Alternatively, the terminal may not receive any RAR returned by the base station throughout the RAR time window. In this case, the terminal fails the present random access and has to wait for initiation of the next random access. FIG. 15 is a diagram that random access by a terminal fails, according to embodiments of the present disclosure. As shown in FIG. 15, a first RO 1501, a RAR time window 1502, and a second RO 1503 are included. The terminal fails to send a random access preamble in a time-frequency resource of the first RO and succeeds in sending a random access preamble in a time-frequency resource of the second RO. If the terminal does not receive any RAR returned by a base station throughout the RAR time window, the terminal fails the present random access and has to wait for the start of the next random access.

Alternatively, after the terminal has monitored the RAR returned by the base station for the first time in the RAR time window, the terminal may directly end monitoring the RAR returned by the base station. That is, the terminal no longer monitors the RAR returned by the base station in the present random access process, and ends the step of monitoring the RAR returned by the base station in the random access process. Alternatively, the terminal may stop performing random access preamble transmission in a subsequent RO in the present random access process. That is, the terminal ends the RAR monitoring step in the random access process by stopping sending any preamble in the subsequent RO. That is, in the random access flow provided in embodiments of the present disclosure, after a random access preamble is successfully sent, the actual length of the RAR time window may vary depending on when a RAR returned by the base station is monitored. When the terminal receives a RAR, the terminal may end the RAR time window in advance, thereby saving time in random access. In a possible implementation, after the terminal has successfully sent a random access preamble in the first RO, the terminal also successfully sends a random access preamble in the second RO, and receives, after the second RO, a RAR returned by the base station in response to the random access preamble sent by the terminal in the first RO. In this case, the terminal may also end the RAR time window.

In a possible implementation, when the terminal monitors a RAR returned by the base station within the RAR time window, the terminal may start to perform, according to the monitored RAR returned by the base station, the step of sending a random access message 3 to the base station.

Note that the base station may return the RAR to the terminal in the LBT mode. That is, when returning the RAR, the base station may also monitor, via LBT, whether a RAR channel resource is idle, and send the RAR on an idle RAR channel resource. If the terminal receives no RAR sent by the base station throughout a period of a predetermined duration, then the present random access fails and the terminal waits to initiate the next random access and enter a new random access flow to perform the steps provided in embodiments of the present disclosure.

To sum up, with the present disclosure, by adding a second RO in a random access process in an unlicensed channel, a terminal is allowed to send a random access preamble also through the second RO. That is, the terminal may send the random access preamble multiple times in one random access process, which saves the time for the terminal to wait for start of the next random access after a failed random access preamble transmission in the first RO, thereby reducing the delay in NR-U-based random access, improving the efficiency in NR-U-based random access.

A device embodiment according to the present disclosure is described below. The device may be configured to perform a method embodiment according to the present disclosure. Refer to the method embodiment of the present disclosure for any detail not disclosed in the device embodiment of the present disclosure.

Figure 16:
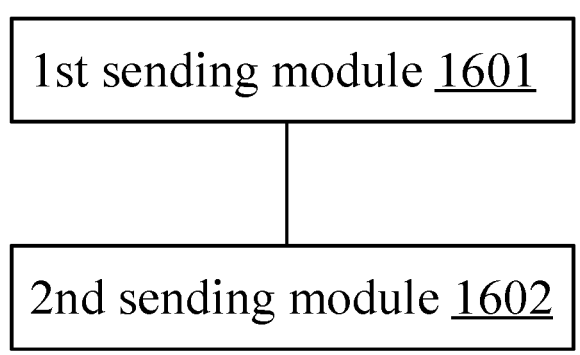
FIG. 16 is a block diagram of a device for transmitting a random access message according to an illustrative embodiment.

FIG. 16 is a block diagram of a device for transmitting a random access message according to an illustrative embodiment. As shown in FIG. 16, the device for transmitting a random access message may be implemented as all or part of a terminal in the implementation environment shown in FIG. 1 by hardware or a combination of software and hardware, to perform steps performed by the terminal in any embodiment shown in FIG. 5 or FIG. 6. The device for transmitting a random access message may include a first sending module and a second sending module.

The first sending module 1601 is configured to, in a random access process based on an unlicensed channel, perform random access preamble transmission in a first Rach Occasion (RO) in a Listen Before Talk (LBT) mode before arrival of the first RO. The first RO is a first RO selected in the random access process.

The second sending module 1602 is configured to, in response to a Random Access Response (RAR) returned by a base station not being received before arrival of a second RO, perform random access preamble transmission in the second RO in the LBT mode. The second RO is any one RO within a RAR time window corresponding to the random access process. The RAR time window is a period of a predetermined duration starting after the first RO.

Alternatively, the device further includes a monitoring module.

The monitoring module may be configured to, in the random access process, monitor the RAR returned by the base station starting upon a first successful random access preamble transmission.

Alternatively, the device further includes an ending module.

The ending module may be configured to, in response to the RAR returned by the base station being received before arrival of the second RO, end monitoring the RAR returned by the base station after the RAR returned by the base station has been monitored for a first time within the RAR time window.

Alternatively, the device further includes a stopping module.

The stopping module may be configured to stop random access preamble transmission in a subsequent RO after the RAR returned by the base station has been monitored for the first time within the RAR time window.

Alternatively, the first sending module 1601 includes a first sending sub-module.

The first sending sub-module may be configured to perform random access preamble transmission in the first RO in an LBT mode without random backoff.

Alternatively, the first sending module 1601 includes a second sending sub-module.

The second sending sub-module may be configured to, in response to monitoring that a target frequency domain interval is in an idle state within a preset duration before start of the first RO, transmit a random access preamble on one time-frequency unit of at least two time-frequency units corresponding.

The target frequency domain interval may be a frequency domain interval including a frequency band in which the at least two time-frequency units are located.

Alternatively, the at least two time-frequency units are frequency division multiplexed in an unlicensed channel resource pool.

Alternatively, the at least two time-frequency units may be frequency division multiplexed and time division multiplexed in the unlicensed channel resource pool Alternatively, the device further includes a receiving module.

The receiving module may be configured to, before performing random access preamble transmission in the first RO in the LBT mode, receive random access configuration information sent by the base station. The random access configuration information may be configured to indicate an RO available to the terminal and a duration of the RAR time window.

Division of the functional modules in implementing the function of the device according to the embodiment is merely illustrative. In application, the function may be allocated to be carried out by different functional modules as needed. That is, a content structure of the equipment may be divided into different functional modules for carrying out all or part of the function.

A module of the device according to an aforementioned embodiment here may perform an operation in a mode elaborated in an aforementioned embodiment of the method herein, which will not be repeated here.

An illustrative embodiment of the present disclosure provides a device for transmitting a random access message, capable of implementing all or part of the steps performed by a terminal in the embodiment shown in FIG. 5 or FIG. 6. The device for transmitting a random access message includes a processor and a memory for storing processor executable instructions.

The processor is configured to implement:
in a random access process based on an unlicensed channel, performing random access preamble transmission in a first Rach Occasion (RO) in a Listen Before Talk (LBT) mode before arrival of the first RO, the first RO being a first RO selected in the random access process; and
in response to a Random Access Response (RAR) returned by a base station not being received before arrival of a second RO, performing random access preamble transmission in the second RO in the LBT mode, the second RO being any one RO within a RAR time window corresponding to the random access process, the RAR time window being a period of a predetermined duration starting after the first RO.

Alternatively, the processor is further configured to implement,
in response to the RAR returned by the base station being received before arrival of the second RO, ending monitoring of the RAR returned by the base station after the RAR returned by the base station has been monitored for a first time within the RAR time window.

Alternatively, the processor is further configured to implement:
in response to the RAR returned by the base station being received before arrival of the second RO, ending monitoring of the RAR returned by the base station after the RAR returned by the base station has been monitored for a first time within the RAR time window.

Alternatively, the processor is further configured to implement:
stopping random access preamble transmission in a subsequent RO after the RAR returned by the base station has been monitored for the first time within the RAR time window.

Alternatively, the processor is further configured to perform random access preamble transmission in the first RO in the LBT mode by:
performing random access preamble transmission in the first RO in an LBT mode without random backoff.

Alternatively, the processor is further configured to perform random access preamble transmission in the first RO in the LBT mode by:
in response to monitoring that a target frequency domain interval is in an idle state within a preset duration before start of the first RO, sending a random access preamble on one time-frequency unit of at least two time-frequency units corresponding to the first RO.

The target frequency domain interval may be a frequency domain interval including a frequency band in which the at least two time-frequency units are located.

Alternatively, the at least two time-frequency units are frequency division multiplexed in an unlicensed channel resource pool.

Alternatively, the at least two time-frequency units may be frequency division multiplexed and time division multiplexed in the unlicensed channel resource pool.

Alternatively, the processor is further configured to, before performing random access preamble transmission in the first RO in the LBT mode, receive random access configuration information sent by the base station.

The random access configuration information may be configured to indicate an RO available to the terminal and a duration of the RAR time window.

A solution provided by embodiments of the present disclosure has been introduced mainly taking a terminal and a base station as an example. It may be understood that, the terminal and the base station include a hardware structure and/or a software module for implementing a function here. Combining an illustrative module as well as an illustrative algorithm step disclosed in embodiments of the present disclosure, embodiments of the present disclosure can be implemented by hardware or a combination of hardware and computer software. Whether a function is implemented by hardware or by computer software driven hardware may depend on a specific application of a technical solution as well as a design constraint. Depending on a specific application, a person having ordinary skill in the art may implement a described function using different methods. Such implementation however should not be deemed going beyond a scope of a technical solution provided by embodiments of the present disclosure.

Figure 17:
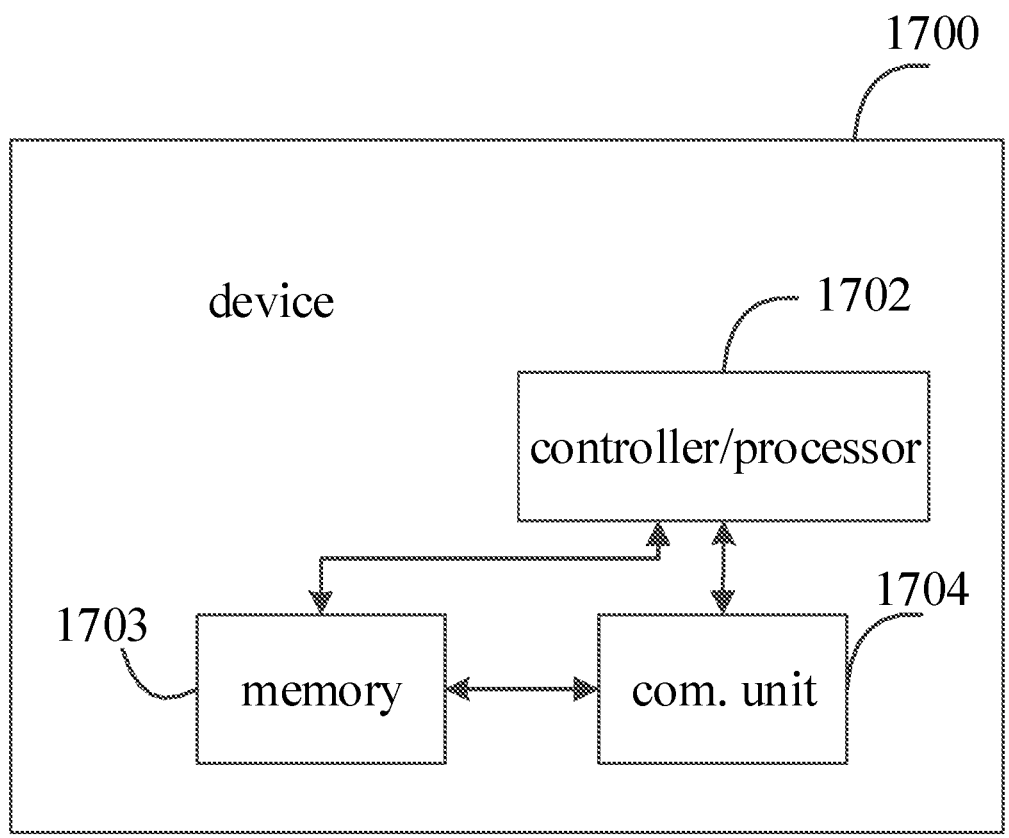
FIG. 17 is a diagram of a structure of a device for transmitting a random access message according to an illustrative embodiment.

FIG. 17 is a diagram of a structure of a device for transmitting a random access message according to an illustrative embodiment. The device 1700 may be implemented as a terminal or a base station in the various embodiments described above.

The device 1700 includes a communication unit 1704 and a processor 1702. The processor 1702 may also be a controller and is shown as "controller/processor 1702" in FIG. 17. The communication unit 1704 is configured to support communication between a terminal and other network equipment such as a base station, etc.

Further, the device 1700 may further include a memory 1703. The memory 1703 is configured to store a program code and data of the terminal 1700.

It will be appreciated that FIG. 17 shows just a simplified design of the device 1700. In practical application, the device 1700 may include any number of processors, controllers, memories, communication units, etc., and all terminals or base stations that may implement embodiments of the present disclosure fall within the protection scope of embodiments of the present disclosure.

A person having ordinary skill in the art may realize that a function illustrated herein may be implemented by hardware, software, firmware, or any combination of the any listed item in the one or more examples herein. When implemented by software, such a function may be stored in a computer-readable medium, or transmitted as one or more instructions or codes on the computer-readable medium. The computer-readable medium may include a computer storage medium, a communication medium, etc. The communication medium may include any medium that facilitates transmitting a computer program from one place to another. The storage medium may be any available medium accessible by a universal or dedicated computer.

Embodiments of the present disclosure further provide a computer storage medium for storing computer software instructions for use by the terminal or the base station, including a program designed to perform a method for transmitting a random access message here.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative only, with a true scope and spirit of the present disclosure being indicated by the appended claims.

According to one aspect of the present disclosure, there is provided a method for transmitting a random access message. The method is implemented by a terminal. The method includes:
- in a random access process based on an unlicensed channel, performing random access preamble transmission in a first RO in an LBT mode before arrival of the first RO, where the first RO is a first RO selected in the random access process; and
- in response to determining that a RAR returned by a base station not being received before arrival of a second RO, performing random access preamble transmission in the second RO in the LBT mode, where the second RO is any RO within a RAR time window corresponding to the random access process, and the RAR time window being a period of a predetermined duration starting after the first RO.

Alternatively, the method further includes:
- in the random access process, monitoring the RAR returned by the base station starting upon a first successful random access preamble transmission.

Alternatively, the method further includes:
- in response to determining that the RAR returned by the base station is received before arrival of the second RO, ending monitoring of the RAR returned by the base station after the RAR returned by the base station has been monitored for a first time within the RAR time window.

Alternatively, the method further includes:
- stopping random access preamble transmission in a subsequent RO after the RAR returned by the base station has been monitored for the first time within the RAR time window.

Alternatively, performing random access preamble transmission in the first RO in the LBT mode includes:
- performing random access preamble transmission in the first RO in an LBT mode without random backoff.

Alternatively, performing random access preamble transmission in the first RO in the LBT mode includes:
- in response to monitoring that a target frequency domain interval is in an idle state within a preset duration before start of the first RO, sending a random access preamble on one time-frequency unit of at least two time-frequency units corresponding to the first RO.

The target frequency domain interval may be a frequency domain interval including a frequency band in which the at least two time-frequency units are located.

Alternatively, the at least two time-frequency units are frequency division multiplexed in an unlicensed channel resource pool.

Alternatively, the at least two time-frequency units may be frequency division multiplexed and time division multiplexed in the unlicensed channel resource pool.

According to another aspect of the present disclosure, there is provided a device for transmitting a random access message. The device is applied to a terminal. The device includes a first sending module and a second sending module.

The first sending module is configured to, in a random access process based on an unlicensed channel, perform random access preamble transmission in a first RO in an LBT mode before arrival of the first RO. The first RO is a first RO selected in the random access process.

The second sending module is configured to, in response to determining that a RAR returned by a base station not being received before arrival of a second RO, perform random access preamble transmission in the second RO in the LBT mode. The second RO is any RO within a RAR time window corresponding to the random access process. The RAR time window is a period of a predetermined duration starting after the first RO.

Alternatively, the device further includes a monitoring module.

The monitoring module may be configured to, in the random access process, monitor the RAR returned by the base station starting upon a first successful random access preamble transmission.

Alternatively, the device further includes an ending module.

The ending module may be configured to, in response to determining that the RAR returned by the base station is received before arrival of the second RO, end monitoring the RAR returned by the base station after the RAR returned by the base station has been monitored for a first time within the RAR time window.

Alternatively, the device further includes a stopping module.

The stopping module may be configured to stop random access preamble transmission in a subsequent RO after the RAR returned by the base station has been monitored for the first time within the RAR time window.

Alternatively, the first sending module includes a first sending sub-module.

The first sending sub-module may be configured to perform random access preamble transmission in the first RO in an LBT mode without random backoff.

Alternatively, the first sending module includes a second sending sub-module.

The second sending sub-module may be configured to, in response to monitoring that a target frequency domain interval is in an idle state within a preset duration before start of the first RO, transmit a random access preamble on one time-frequency unit of at least two time-frequency units corresponding.

The target frequency domain interval may be a frequency domain interval including a frequency band in which the at least two time-frequency units are located.

Alternatively, the at least two time-frequency units are frequency division multiplexed in an unlicensed channel resource pool.

Alternatively, the at least two time-frequency units may be frequency division multiplexed and time division multiplexed in the unlicensed channel resource pool.

According to another aspect of the present disclosure, there is provided a device for transmitting a random access message. The device is applied to a terminal.

The device includes a processor.

The device includes a memory configured to store processor executable instructions.

The processor is configured to implement:

in a random access process based on an unlicensed channel, performing random access preamble transmission in a first RO in an LBT mode before arrival of the first RO, where the first RO is a first RO selected in the random access process; and in response to determining that a RAR returned by a base station not being received before arrival of a second RO, performing random access preamble transmission in the second RO in the LBT mode, where the second RO is any RO within a RAR time window corresponding to the random access process, and the RAR time window is a period of a predetermined duration starting after the first RO.

According to another aspect of the present disclosure, there is provided a computer-readable storage medium having stored therein instructions which, when executed by a processor in a terminal, implement any method here.

A technical solution provided by embodiments of the present disclosure may include beneficial effects at least as follows.

In a random access process based on an unlicensed channel, a terminal performs random access preamble transmission in a first RO in an LBT mode before arrival of the first RO. If the terminal does not receive a RAR returned by a base station before arrival of a second RO, the terminal continues to perform random access preamble transmission in the second RO in the LBT mode. With the present disclosure, by adding a second RO in a random access process in an unlicensed channel, a terminal is allowed to send a random access preamble also through the second RO. That is, the terminal may send the random access preamble multiple times in one random access process, which saves the time for the terminal to wait for start of the next random access after a failed random access preamble transmission in the first RO, thereby reducing the delay in NR-U-based random access, improving the efficiency in NR-U-based random access.

It should be It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

What is claimed is:

1. A method for transmitting a random access message, comprising:

in a random access process based on an unlicensed channel, performing, by a terminal, random access preamble transmission in a first Rach Occasion (RO) in a Listen Before Talk (LBT) mode before arrival of the first RO, the first RO being a first RO selected in the random access process; and in response to determining that a Random Access Response (RAR) returned by a base station is not received before arrival of a second RO, performing, by the terminal, random access preamble transmission in the second RO in the LBT mode, the second RO being any RO within a RAR time window corresponding to the random access process, the RAR time window being a period of a predetermined duration starting after the first RO, wherein performing random access preamble transmission in the first RO in the LBT mode comprises: in response to monitoring that a target frequency domain interval is in an idle state within a preset duration before start of the first RO, sending a random access preamble on one time-frequency unit of at least two time-frequency units corresponding to the first RO; and wherein the target frequency domain interval is a frequency domain interval including a frequency band in which the at least two time-frequency units are located.

2. The method of claim 1, further comprising:

in the random access process, monitoring the RAR returned by the base station starting upon a first successful random access preamble transmission.

3. The method of claim 1, further comprising:

in response to determining that the RAR returned by the base station is received before arrival of the second RO, ending monitoring of the RAR returned by the base station after the RAR returned by the base station has been monitored for a first time within the RAR time window.

4. The method claim 3, further comprising:

stopping random access preamble transmission in a subsequent RO after the RAR returned by the base station has been monitored for the first time within the RAR time window.

5. The method of claim 1, wherein performing random access preamble transmission in the first RO in the LBT mode comprises:

performing random access preamble transmission in the first RO in an LBT mode without random backoff.

6. The method of claim 1, wherein the at least two time-frequency units are frequency division multiplexed, or frequency division multiplexed and time division multiplexed, in an unlicensed channel resource pool.

7. A device for transmitting a random access message, applied to a terminal, comprising:

a processor; and a memory configured to store processor executable instructions, wherein the processor is configured to implement acts comprising:

in a random access process based on an unlicensed channel, performing random access preamble transmission in a first Rach Occasion (RO) in a Listen Before Talk (LBT) mode before arrival of the first RO, the first RO being a first RO selected in the random access process;

in response to determining that a Random Access Response (RAR) returned by a base station is not received before arrival of a second RO, performing random access preamble transmission in the second RO in the LBT mode, the second RO being any RO within a RAR time window corresponding to the random access process, the RAR time window being a period of a predetermined duration starting after the first RO; and in response to monitoring that a target frequency domain interval is in an idle state within a preset duration before start of the first RO, sending a random access preamble on one time-frequency unit of at least two time-frequency units corresponding to the first RO so that the device performs random access preamble transmission in the first RO in the LBT mode, wherein the target frequency domain interval is a frequency domain interval including a frequency band in which the at least two time-frequency units are located.

8. The device of claim 7, wherein the processor is further configured to implement acts comprising:
in the random access process, monitoring the RAR returned by the base station starting upon a first successful random access preamble transmission.

9. The device of claim 7, wherein the processor is further configured to implement acts comprising:
in response to determining that the RAR returned by the base station is received before arrival of the second RO, ending monitoring of the RAR returned by the base station after the RAR returned by the base station has been monitored for a first time within the RAR time window.

10. The device of claim 9, wherein the processor is further configured to implement acts comprising:
stopping random access preamble transmission in a subsequent RO after the RAR returned by the base station has been monitored for the first time within the RAR time window.

11. The device of claim 7, wherein the processor is configured to perform random access preamble transmission in the first RO in the LBT mode by:
performing random access preamble transmission in the first RO in an LBT mode without random backoff.

12. The device of claim 7,
wherein the at least two time-frequency units are frequency division multiplexed, or frequency division multiplexed and time division multiplexed, in an unlicensed channel resource pool.

13. A non-transitory computer-readable storage medium having stored therein instructions which, when executed by a processor in a terminal, implement acts comprising:
in a random access process based on an unlicensed channel, performing random access preamble transmission in a first Rach Occasion (RO) in a Listen Before Talk (LBT) mode before arrival of the first RO, the first RO being a first RO selected in the random access process; and in response to determining that a Random Access Response (RAR) returned by a base station is not received before arrival of a second RO, performing random access preamble transmission in the second RO in the LBT mode, the second RO being any RO within a RAR time window corresponding to the random access process, the RAR time window being a period of a predetermined duration starting after the first RO, wherein the instructions are for performing random access preamble transmission in the first RO in the LBT mode by: in response to monitoring that a target frequency domain interval is in an idle state within a preset duration before start of the first RO, sending a random access preamble on one time-frequency unit of at least two time-frequency units corresponding to the first RO, wherein the target frequency domain interval is a frequency domain interval including a frequency band in which the at least two time-frequency units are located.

14. The storage medium of claim 13, wherein the instructions are further for:
in the random access process, monitoring the RAR returned by the base station starting upon a first successful random access preamble transmission.

15. The storage medium of claim 13, wherein the instructions are further for:
in response to determining that the RAR returned by the base station is received before arrival of the second RO, ending monitoring of the RAR returned by the base station after the RAR returned by the base station has been monitored for a first time within the RAR time window.

16. The storage medium of claim 15, wherein the instructions are further for:
stopping random access preamble transmission in a subsequent RO after the RAR returned by the base station has been monitored for the first time within the RAR time window.

17. The storage medium of claim 13, wherein the instructions are for performing random access preamble transmission in the first RO in the LBT mode by:
performing random access preamble transmission in the first RO in an LBT mode without random backoff.

* * * * *